US007072996B2

(12) United States Patent
Adusumilli et al.

(10) Patent No.: US 7,072,996 B2
(45) Date of Patent: Jul. 4, 2006

(54) SYSTEM AND METHOD OF TRANSFERRING DATA BETWEEN A PROCESSING ENGINE AND A PLURALITY OF BUS TYPES USING AN ARBITER

(75) Inventors: Swaroop Adusumilli, Phoenix, AZ (US); Satish N. Anand, Chandler, AZ (US); Hemanshu Bhatnagar, Phoenix, AZ (US)

(73) Assignee: Corrent Corporation, Tempe, AZ (US)

( * ) Notice: Subject to any disclaimer, the term of this patent is extended or adjusted under 35 U.S.C. 154(b) by 387 days.

(21) Appl. No.: 10/172,814

(22) Filed: Jun. 12, 2002

(65) Prior Publication Data

US 2003/0126319 A1 Jul. 3, 2003

Related U.S. Application Data

(60) Provisional application No. 60/297,975, filed on Jun. 13, 2001.

(51) Int. Cl.
*G06F 13/28* (2006.01)

(52) U.S. Cl. .......................... 710/22; 710/45; 710/114; 710/308; 710/309; 710/313

(58) Field of Classification Search .................. 710/22, 710/45, 114, 308, 309, 313
See application file for complete search history.

(56) References Cited

U.S. PATENT DOCUMENTS

| | | | | |
|---|---|---|---|---|
| 5,546,547 A | * | 8/1996 | Bowes et al. ................ | 710/114 |
| 5,566,306 A | | 10/1996 | Ishida | |
| 5,828,856 A | * | 10/1998 | Bowes et al. ................ | 710/308 |
| 5,870,570 A | | 2/1999 | Chambers et al. | |
| 5,872,936 A | * | 2/1999 | Eckstein ...................... | 710/107 |
| 5,878,217 A | | 3/1999 | Cherukuri | |
| 6,134,625 A | | 10/2000 | Abramson | |
| 6,195,722 B1 | * | 2/2001 | Ram et al. ................... | 710/310 |
| 6,205,524 B1 | * | 3/2001 | Ng ............................... | 711/151 |
| 6,272,582 B1 | * | 8/2001 | Streitenberger et al. .... | 710/314 |
| 6,275,491 B1 | * | 8/2001 | Prasad et al. ................ | 370/389 |
| 6,434,645 B1 | * | 8/2002 | Parvin et al. ................. | 710/72 |
| 6,487,628 B1 | * | 11/2002 | Duong et al. ................ | 710/313 |

(Continued)

OTHER PUBLICATIONS

IBM Technical Disclosure Bulletin, Apr. 1995, US, Title: "Micro Channel Architecutre for Real-Time Multimedia", TDB-ACC-NO: NN9504535.*

(Continued)

*Primary Examiner*—Henry W. H. Tsai
*Assistant Examiner*—Niketa Patel
(74) *Attorney, Agent, or Firm*—Ingrassia Fisher & Lorenz PC

(57) ABSTRACT

A flexible input/output (I/O) interface allows a processing core to communicate high-speed data with a several different types of interfaces including a Direct Memory Access (DMA) interface and a streaming interface. The I/O interface includes a streaming interface for transferring streamed data from the streaming data bus to the core-processing engine, a DMA interface for transferring DMA data from the DMA data bus to the core-processing engine, and an arbiter for coordinating data transfer with the core-processing engine between the streaming interface and DMA interface. The arbiter may operate in a split-bus-mode wherein the arbiter performs the address phase for more than one channel prior to entering into the data phase. The flexible I/O interface may include a common address bus and data bus between the processing engine and the interfaces. Alternatively, a switching fabric may couple separate address and data buss of the interfaces with the processing engine.

25 Claims, 6 Drawing Sheets

U.S. PATENT DOCUMENTS

| | | | |
|---|---|---|---|
| 6,556,580 B1 * | 4/2003 | Wang et al. | 370/412 |
| 6,608,625 B1 * | 8/2003 | Chin et al. | 345/501 |
| 6,636,915 B1 * | 10/2003 | Dabby et al. | 710/240 |
| 6,651,122 B1 * | 11/2003 | Porterfield | 710/100 |
| 6,684,296 B1 * | 1/2004 | Hayter et al. | 711/118 |
| 6,728,808 B1 * | 4/2004 | Brown | 710/107 |
| 6,785,230 B1 * | 8/2004 | Ogata et al. | 370/230 |

OTHER PUBLICATIONS

International Search Report for corresponding PCT application No. PCT/US02/18681.

* cited by examiner

SYSTEM AND METHOD OF TRANSFERRING DATA BETWEEN A PROCESSING ENGINE AND A PLURALITY OF BUS TYPES USING AN ARBITER

PRIORITY CLAIM UNDER 35 U.S.C. 119

This patent application claims priority under 35 U.S.C. 119(e) claiming the benefit of earlier filed U.S. provisional patent application Ser. No. 60/297,975, filed Jun. 13, 2001.

FIELD OF THE INVENTION

This invention relates in general to the field of electronic communications, and in particular to input/output (I/O) devices, and in one embodiment, to direct memory access (DMA) I/O devices and streaming interface I/O devices to interface with a processing core.

BACKGROUND OF THE INVENTION

In general, systems that perform data transfer to and from a processing unit either operate in a direct memory transfer access (DMA) mode or a streaming mode. In the DMA mode, the transfer of data between an I/O device and a memory unit is facilitated without the direct control of a central processing unit (CPU). Data can either be transferred from memory to an I/O device (a memory source transfer) or from an I/O device to memory (a memory destination transfer). DMA transfers typically involve the transfer of one or more blocks of data, as data transfers of only a few bytes of data are often performed more efficiently under the direct control of the CPU.

In a streaming mode on the other hand, data is streamed directly to the device requesting the data without being stored first in a local or host memory. The addressing information required for a DMA interface is not required when operating in a streaming mode.

DMA I/O interfaces may include, for example, the PCI, PCI 2.0, PCI 2.1, PCI 2.2, PCIX, Infiniband by Intel, and HyperTransport. Streaming interfaces may include, for example, the Packet-Over-SONET Physical-Layer Three (POS-PHY3) referred to as a PL3 interface, SPI 4, and GMII as well as other packet interfaces. In general, data is retrieved from DMA-type interfaces while data is pushed from streaming-type interfaces. Because each type of interface may have unique requirements, processing cores and their associated support systems are generally designed specifically for interfacing with one particular type of interface. This unfortunately requires a significant redesign of a processing core for each type of interface, which among other things, increases costs as well as increases time-to-market.

Thus, there is a general need for improved system and method to interface with a processing core. There is also a general need for a system and method that reduces design costs and time-to-market while also providing a flexible interface for both streamed and DMA data. There is also a general need for a system and method that provides a common bus interface for a processing core. There is also a general need for a system and method that provides for the transfer of both streaming and DMA data. There is also a general need for a system and method a system and method that may allow a processing core to communicate high-speed data with a several different types of interfaces including DMA interfaces and streaming interfaces.

SUMMARY OF THE INVENTION

In one embodiment, the present invention provides, among other things, an input/output (I/O) system that transfers control and data between a core-processing engine and a plurality of bus types including a direct memory access (DMA) bus and a streaming data bus. The system comprises a streaming interface for transferring streamed data from the streaming data bus to the core-processing engine, a DMA interface for transferring DMA data from the DMA data bus to the core-processing engine, and an arbiter for coordinating data transfer with the core-processing engine between the streaming interface and DMA interface.

In accordance with an embodiment, an arbiter receives a request to process data from the core-processing engine indicating when the core-processing engine is ready to process data, selects either the streaming interface or the DMA interface, enters into an address phase with the core-processing engine, and enters into a data phase with the core-processing engine to transfer data from the selected interface to the core-processing engine. In one embodiment when the streaming interface is selected, during an addressing phase, a dummy address may be used for a host source address for reading data. In addition, a dummy address may be used as a host destination address when writing data. In one embodiment, the arbiter may operate in a split-bus-type mode performing the address phase for one or more channels of a plurality of channels prior to entering into a data phase for one of the channels. In one embodiment, several address phases are performed before the first data phase is performed.

In one embodiment, the present invention provides a method of transferring control and data between a core-processing engine and a plurality of bus types including a DMA bus and a streaming data bus. The method may comprise transferring streamed data from the streaming data bus to the core-processing engine using a streaming interface, transferring DMA data from the DMA data bus to the core-processing engine using a DMA interface, and coordinating data transfer with the core-processing engine between the streaming interface and DMA interface using an arbiter.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION OF THE DRAWINGS

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

In one embodiment, the present invention provides, among other things a flexible input/output (I/O) interface that allows a processing core to communicate high-speed data with a several different types of interfaces including a Direct Memory Access (DMA) interface and a streaming interface. The flexible I/O may also provide a common bus interface to the processing core and may allow the processing core to interface with any type of streaming and DMA type interfaces without redesign.

Figure 1:
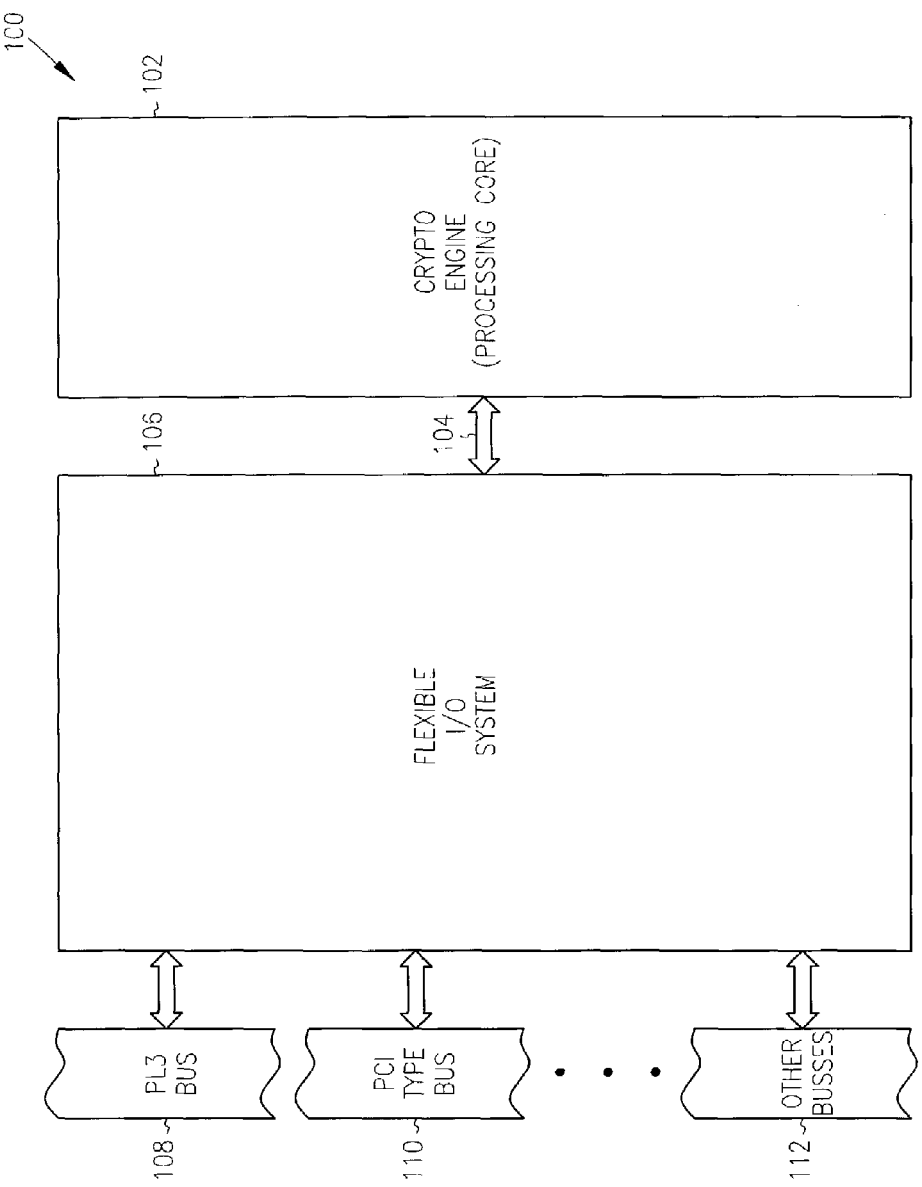
FIG. 1 is a simplified functional block diagram of a system architecture configuration in which an embodiment of the present invention may be practiced.

FIG. 1 is a simplified functional block diagram of a system architecture configuration in which an embodiment of the present invention may be practiced. System configuration 100 may include processing core 102 to receive data for processing from a plurality of busses 108, 110, 112 through flexible I/O system 106. In one embodiment, processing core 102 may receive data through flexible I/O system 106 in a streamed mode over bus 108, and processing core 102 may receive data through flexible I/O system 106 in a DMA mode over bus 110. In this embodiment, processing core 102 may also provide data to bus 108 through flexible I/O system 106 in a streamed mode, and may provide data to bus 110 through flexible I/O system 106 in a DMA mode. In this embodiment, bus 110 may be configured to communicate data in accordance with, for example, PCI, PCI 2.0, PCI 2.1, PCI 2.2, PCIX, Infiniband by Intel, and/or HyperTransport DMA interface standard. Other DMA configurations may also be suitable for bus 110. In this embodiment, bus 108 may be configured to communicate data in accordance with, for example, the Packet-Over-SONIET Physical-Layer Three (POS-PHY3) referred to as a PL3 interface, SPI 4, and GMII as well as other packet interfaces. Other streaming data configurations may also be suitable for bus 108. Other data busses 112 may be configured to communicate DMA and/or streaming data, and in one embodiment, may include up to ten or even a hundred or more of other busses 112.

Flexible I/O system 106 may arbitrate between data transferred over the several busses, and may perform any protocols to interface with each of the busses and with processing core 102. In one embodiment, system 106 may provide a common bus interface 104 for processing core 102 allowing processing core 102 to communicate differing types of data over a plurality of bus types that implement different bus protocols and/or standards.

In accordance with an embodiment, processing core 102 may be a processing engine, such as a crypto processing core (e.g., crypto engine) that processes blocks of data of a predetermined size. In one embodiment, processing core 102 may process data in a pipelined manner. In one embodiment, processor core 102 may process data in accordance with a plurality of processing threads (i.e., channels). In one embodiment, flexible I/O system 106 and processing core 102 may be fabricated on a single semiconductor chip.

Figure 2:
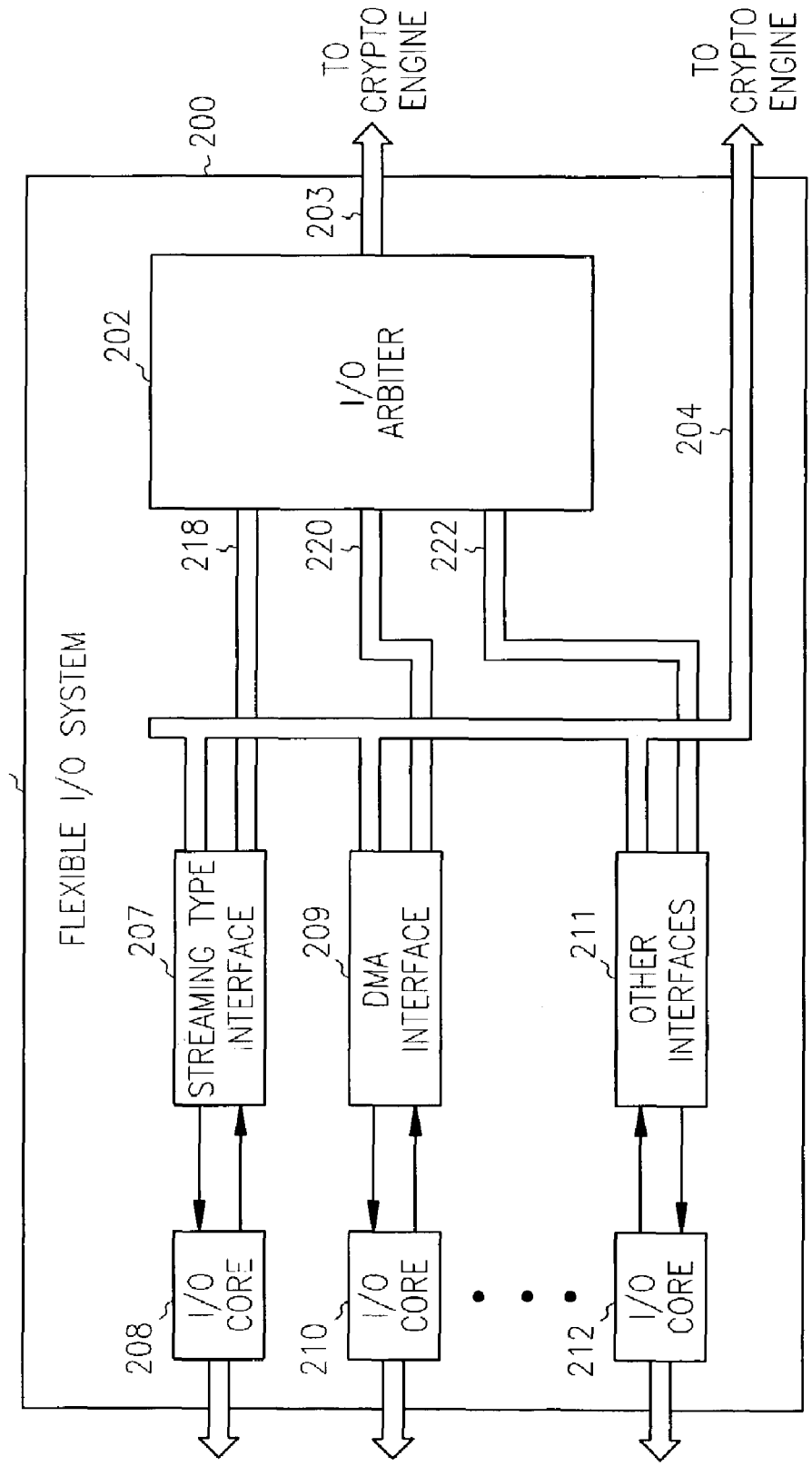
FIG. 2 is a simplified functional block diagram of flexible I/O system in accordance with an embodiment of the present invention.

FIG. 2 is a simplified functional block diagram of flexible I/O system in accordance with an embodiment of the present invention. Flexible I/O system 200 may suitable for use as flexible I/O system 106 (FIG. 1) although I/O systems may also be suitable. Flexible I/O system 200 may comprise streaming-type interface 207 for communicating streamed data through streaming I/O core 208, for example, over a streaming data bus such as bus 108 (FIG. 1). Flexible I/O system 200 may also comprise DMA-type interface 209 for communicating DMA data through DMA I/O core 210 over a DMA data bus, such as bus 110 (FIG. 1). In accordance with an embodiment, flexible I/O system 200 may also comprise other interfaces 211 for communicating other data through other I/O cores 212 over other data buses, such as other busses 112 (FIG. 1). Other interfaces 211 may include interfaces for communicating DMA and/or streamed data. Embodiments of the present invention provide for several other interfaces 212 and may provide for up to ten or even a hundred or more other interfaces 211.

I/O cores 208, 210 and 212 may be state machines that implement a bus protocol in accordance with their associated bus. In one embodiment, interfaces 207, 209 and 211 may share a common address bus and common data bus 204 coupled to processing core 102 (FIG. 1). Interfaces 207, 209 and 211 may also have separate control signal busses, respectively control signal buses 218, 220 and 222, which couple with I/O arbiter 202. Arbiter 202 may arbitrate between the interfaces and may provide a common interface 203 for processing core 102 (FIG. 1).

In an alternate embodiment (not illustrated), interfaces 207, 209 and 211 may not have to share a common address bus and common data bus, such as bus 204. In this embodiment, interfaces 207, 209 and 211 may each have their own address bus and may each have their own data bus coupled to processing core 102 (FIG. 1) through, for example, a switching fabric. This configuration may allow for parallel (rather than serial) communications of each channel of the processing core with any of the I/O interfaces. This embodiment may include, for example, a set of source and destination address and data busses for each channel.

Figure 3:
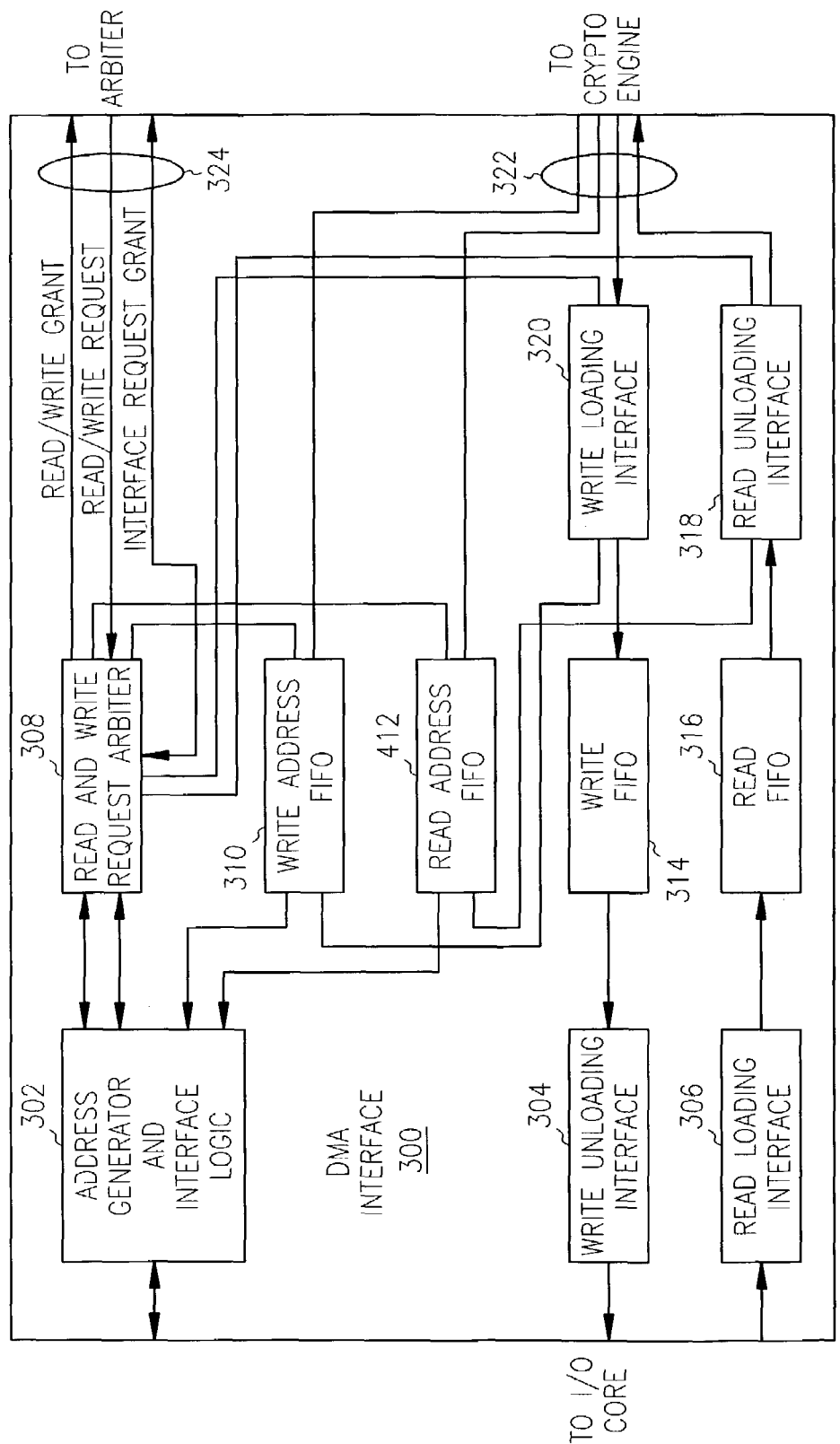
FIG. 3 is a simplified functional block diagram of DMA interface in accordance with an embodiment of the present invention.

FIG. 3 is a simplified functional block diagram of DMA interface in accordance with an embodiment of the present invention. DMA interface 300 is an example of a DMA interface that may be suitable for use as DMA interface 209 (FIG. 2) although other interfaces may also be suitable. Address generator and interface logic element 302 converts address requests and may include logic for interfacing with DMA I/O core 210. Addresses for each of the channels for which processing core processes data may be coordinated by element 302. Read and write request arbiter 308 may operate during addressing phases of a DMA data transfer and may be responsive to read and write request signals provided by arbiter 202 (FIG. 2). Read and write request arbiter 308 may generate read and write grant signals. FIFO's 310 and 312 may buffer the addresses. Data may be transferred through the use of write unloading interface 304, read loading interface 306, write FIFO 314, read FIFO 316, write loading interface 320 and read unloading interface 318. Interfaces 304 and 306 maybe state machines implementing a particular DMA data transfer, such as required for PCI busses. Interfaces 318 and 320 may support both big and little Endian standards, as determined by configuration bits set by a host. In one embodiment, bus 322 may be a common address and data bus coupled with a processing core and may be shared with other interfaces. In another embodiment, bus 322 may be a non-common address bus and/or a non-common data bus coupled with a processing core through a switching fabric allowing interface 300 to access any channel of the processing core in parallel with other interfaces.

A DMA transfer is typically accomplished in the following manner. During the address phase, the processing unit initializes both the DMA interface and the I/O device by indicating, for example, a source address, a destination address, and the amount of data to be transferred. During the data phase, the address and control signals to control the I/O bus are generated to perform successive data transfers until all of the requested data have been transferred from the source to the destination. During the successive data transfers, the source responds to the address and control signals generated by the DMA interface to transmit the requested data, and the destination responds to the address and control signals generated by the DMA interface to receive the data. After the DMA transfer is complete, the DMA interface may notify the processing unit of this condition by activating an interrupt.

In one embodiment, the arbiter may operate in a split-bus-type mode performing the address phase for one or more channels of a plurality of channels prior to entering into a data phase for one of the channels. In one embodiment, several address phases are performed before the first data phase is performed. In these embodiments, address phases may be performed independent of data phases allowing for improved throughput. This may allow for several channels to be queued up depending on the latency of the I/O device until, for example, data for a particular channel is ready.

Figure 4:
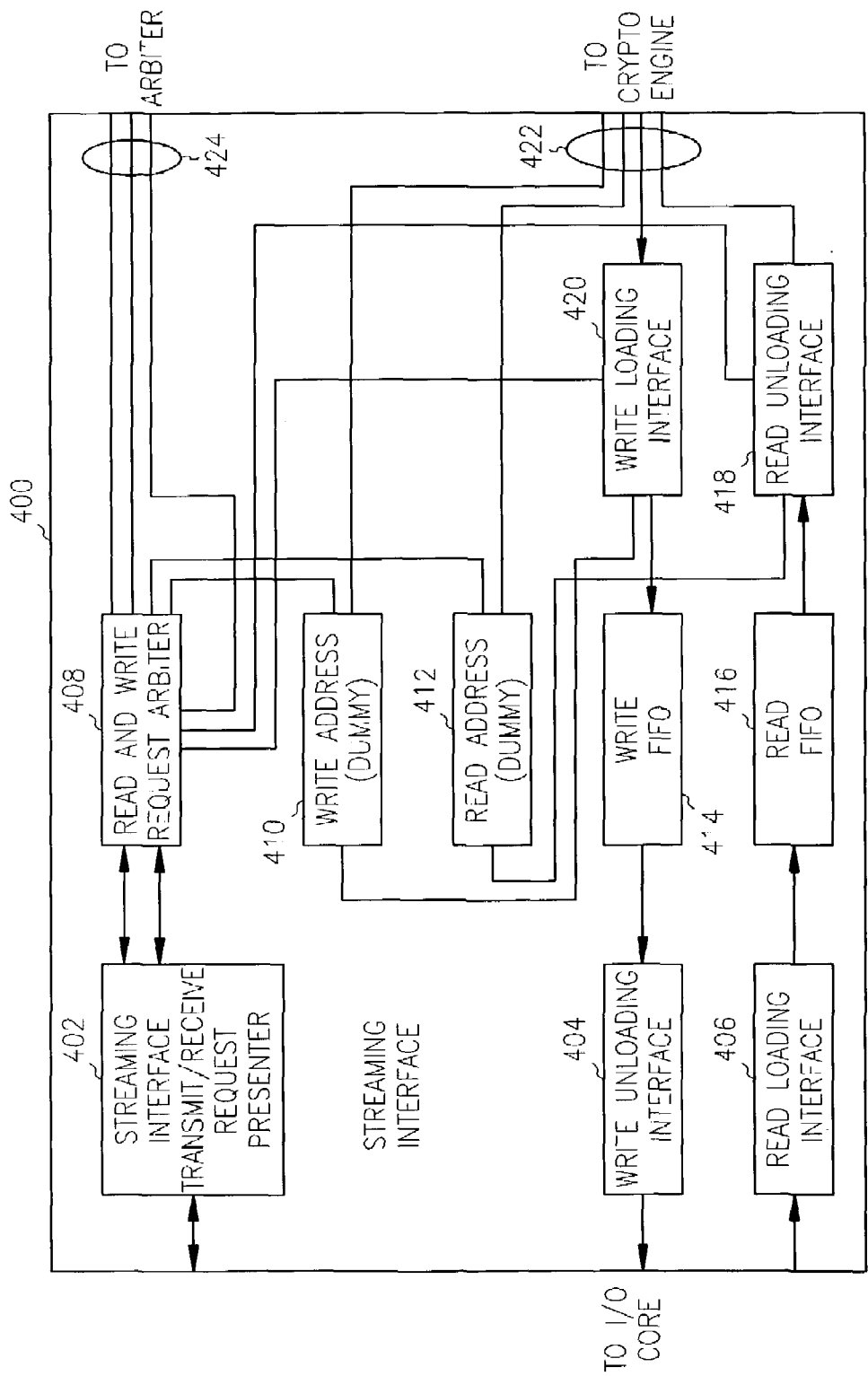
FIG. 4 is a simplified functional block diagram of streaming interface in accordance with an embodiment of the present invention.

FIG. 4 is a simplified functional block diagram of streaming interface in accordance with an embodiment of the present invention. Streaming interface 400 is one example of a streaming interface suitable for use as streaming interface 207 (FIG. 2) although other interfaces may also be suitable. Streaming interface 400 includes transmit/receive request presenter element 402 to coordinate requests for streamed data. Element 403 may include logic for interfacing with streaming interface core 208 (FIG. 2). Read and write request arbiter 408 may be responsive to read and write request signals provided by arbiter 202 (FIG. 2) and may inform the arbiter when streaming data is ready. Read and write request arbiter 408 may generate read and write grant signals. FIFO's 410 and 412 may buffer addresses, including dummy addresses, and are operable for performing an address phase with the processing core. Since streamed data does not require full addressing for the host like DMA data, dummy addresses may be used. In one embodiment when the streaming interface 400 is selected and during the addressing phase, a dummy address may be used for a host source address for reading data, and a dummy address may be used as a host destination address when writing data.

Streamed data may be transferred through the use of write unloading interface 404, read loading interface 406, write FIFO 414, read FIFO 416, write loading interface 420 and read unloading interface 418. Interfaces 404 and 406 may be state machines implementing the transfer of streamed data in accordance with any streamed data protocol, such as, for example, the PL3 standard protocol. In one embodiment, interfaces 418 and 420 may support both big and little Endian standards, determined by configuration bits set by the host. In one embodiment, bus 422 may be a common address and data bus coupled with a processing core and may be shared with other interfaces. In another embodiment, bus 422 may be a non-common address bus and/or a non-common data bus coupled with a processing core through a switching fabric allowing interface 400 to access any channel of the processing core in parallel with other interfaces.

Figure 5:
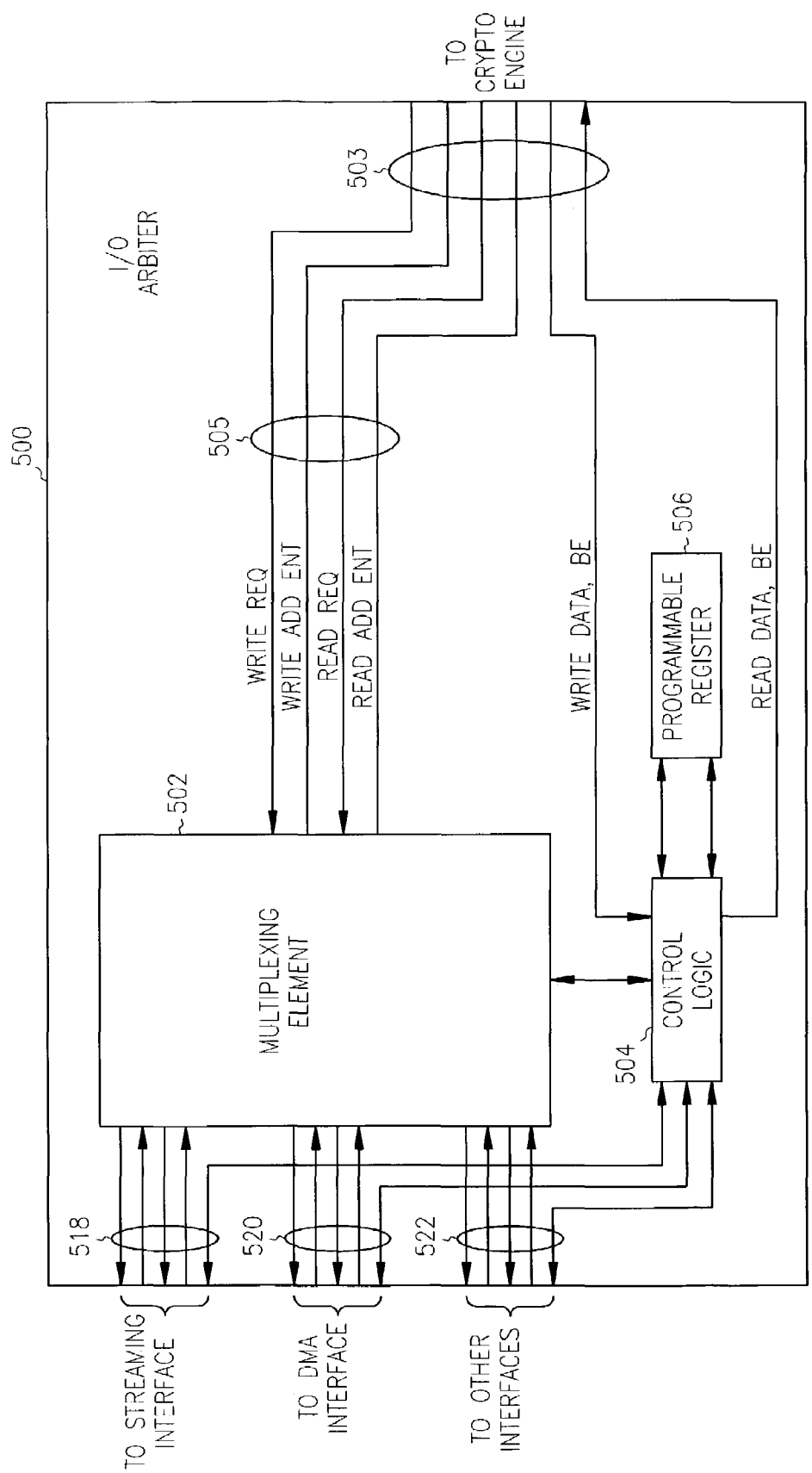
FIG. 5 is a simplified functional block diagram of an arbiter in accordance with an embodiment of the present invention.

FIG. 5 is a simplified functional block diagram of an arbiter in accordance with an embodiment of the present invention. Arbiter 500 may be suitable for use as arbiter 202 (FIG. 2) although other devices may also be suitable. Arbiter 500 comprises multiplexing element 502 to multiplex signals between a processing core and a plurality of interfaces. Programmable register 506 may be programmed by a host and may stores information for identifying which of channel of a plurality of channels may be associated with a particular type of interface. Control logic 504 may coordinate the operation of multiplexing element 502 in response to information in register 506, signals provided by the processing engine and signals provided by the interfaces. In one embodiment, the host may dynamically reconfigure channels by updating the channel information bits contained in register 506. For example, a channel that is receiving data from a DMA-type interface may be switched to receive data over a streaming interface. Control logic 504 may refrain from accessing the control bits for a particular channel stored in register 506 until after a packet transfer. In accordance with one embodiment, processing core 102 may include elements for processing up to eight channels (e.g., eight multiple parallel processing threads) to achieve a higher throughput. In this embodiment, processing core 102 may support signals lines 505 for each channel. In other words, processing core 102 may include read and write request and grant signal lines for each supported channel. The operation of arbiter 500 within system 200 (FIG. 2) is described in more detail below.

Figure 6:
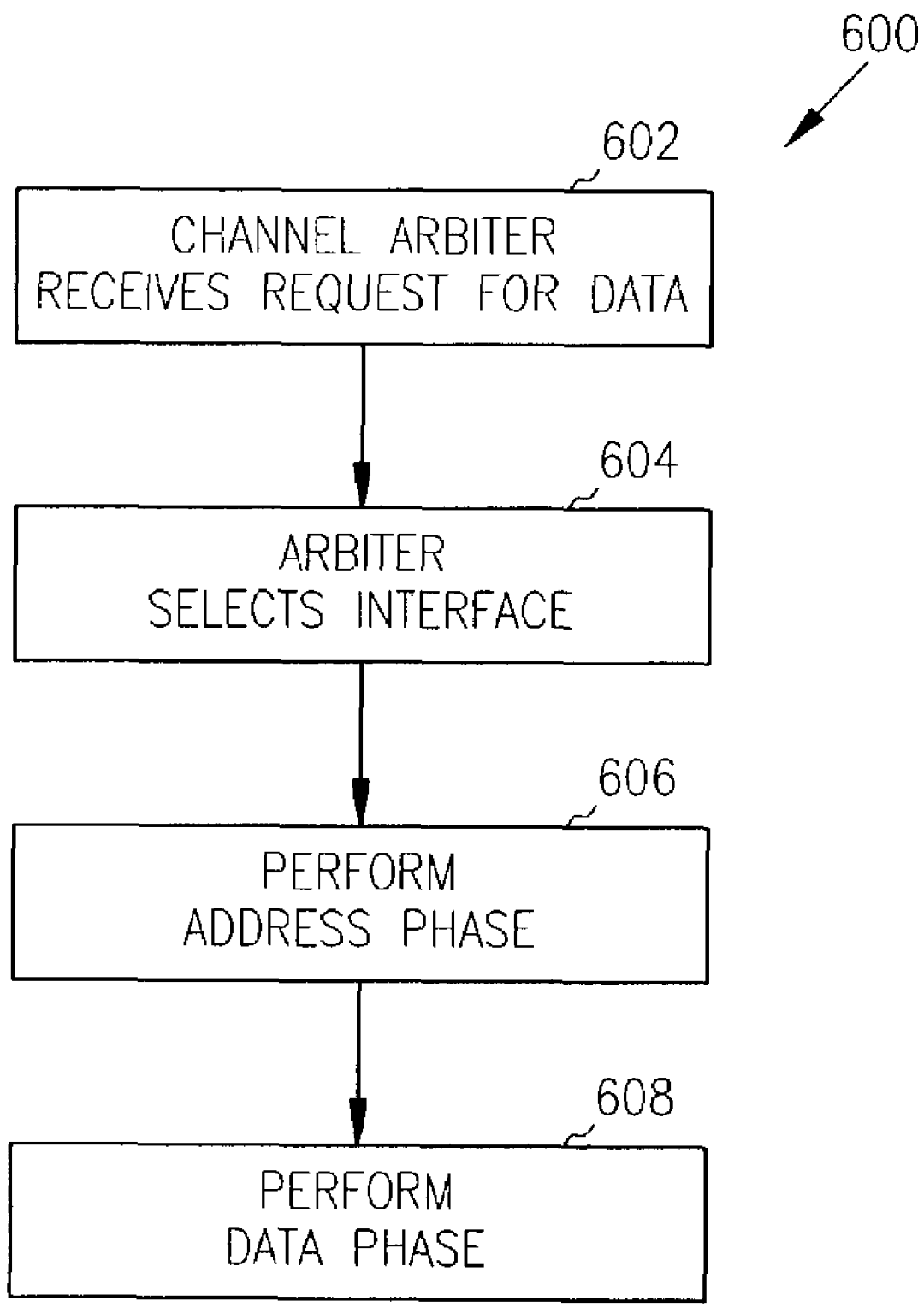
FIG. 6 is a simplified flow chart of a control and data transfer procedure in accordance with an embodiment of the present invention.

FIG. 6 is a simplified flow chart of a control and data transfer procedure in accordance with an embodiment of the present invention. Procedure 600 may be performed by arbiter 500 (FIG. 5) although other device may also be suitable. In task 602, the processing core may generate a request, which may be received by an arbiter. The request may indicate the processing core is ready to process data or that processed data is available. The request may also indicate a particular channel and may be received on a request signal line for that particular channel. In task 604, the arbiter may select an interface for the data transfer by determining whether the available interface matches the channel type (e.g., DMA or streaming) and whether the interface has data available or is ready to accept data.

In task 606, an address phase of the data transfer is performed. The arbiter may coordinate the address phase between the selected interface and the processing core. In an embodiment when the streaming interface is selected, during an addressing phase, a dummy address may be used for a host source address for reading data. In addition, a dummy address may also be used as a host destination address when writing data.

In task 608, a data phase of the data transfer is performed wherein data is transferred between the processing core over a bus associated with the selected interface. In one embodiment, the arbiter may operate in a split-bus-type mode performing the address phase for one or more channels of a plurality of channels prior to entering into a data phase for one of the channels. In one embodiment, several address phases are performed before the first data phase is performed.

Thus, a system and method for interfacing with a processing core has been described. The system and method may reduce design costs and time-to-market. The system and method use a flexible interface for streamed and DMA data. A common bus interface is provided for a processing core allowing for the transfer of both streaming and DMA data. This allows the processing core to communicate high-speed data with a several different types of interfaces including DMA interfaces and streaming interfaces.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. An input/output (I/O) system that transfers control and data between a core-processing engine and a plurality of bus types including a direct memory access (DMA) data bus and a streaming data bus, the system comprising:
   a streaming interface to transfer streamed data between the streaming data bus and the core-processing engine;
   a DMA interface to transfer DMA data between the DMA data bus and the core-processing engine; and
   an arbiter for coordinating data transfer between the core-processing engine and both the streaming interface and the DMA interface, the arbiter configured to receive a data processing request from the core-processing engine, the data processing request indicating when the core-processing engine is ready to process data, the arbiter operable, in response to the data processing request, to (i) select either the streaming interface or the DMA interface, (ii) enter into an address phase with the core-processing engine, and (iii) enter into a data phase with the core-processing engine to transfer data from the selected interface to the core-processing engine,
   wherein, when the streaming interface is selected, during the address phase, a dummy address is used for a host source address for reading data, and a dummy address is used as a host destination address when writing data.

2. The system of claim 1 wherein the request to process data is received on one of a plurality of request signal lines, each request signal line being associated with each of a plurality of channels through which the core-processing engine processes data.

3. The system of claim 1 wherein when the DMA interface is selected, a host address, a local address and a byte count are identified as part of the address phase.

4. The system of claim 3 wherein the arbiter operates in a split-bus-type mode wherein the arbiter performs the address phase for at least one channel of a plurality of channels prior to entering into the data phase for the one of the channels.

5. The system of claim 3 wherein the arbiter operates in a split-bus-type mode wherein the arbiter performs the address phase for more than one channel of a plurality of channels prior to entering into the data phase for a first one of the channels.

6. The system of claim 1 further comprising a common address bus and data bus between the core-processing engine and each of the interfaces.

7. The system of claim 1 further comprising:
   a switching fabric;
   a first address bus and data bus coupling the streaming interface with the core-processing engine through the switching fabric; and
   a second address bus and data bus coupling the DMA interface with the core-processing engine through the switching fabric.

8. The system of claim 2 wherein each channel of the plurality of channels is associated with either streamed data or DMA data, and wherein the arbiter selects either the streaming interface or the DMA interface based on type of data associated with the channel from which the request is received, and wherein in response to the request to process data, the arbiter selects one of the interfaces which has data available for processing.

9. The system of claim 1 wherein the streaming interface is a first interface and the DMA interface is a second interface; and the system further comprises a third interface, and wherein the arbiter coordinates data transfer between the core-processing engine and each of the interfaces.

10. The system of claim 9 wherein the third interface is one of either a second streaming interface for transferring streamed data with the core-processing engine or a second DMA interface for transferring DMA data with the core-processing engine.

11. A method of transferring control and data between a core-processing engine and a plurality of bus types including direct memory access (DMA) bus and a streaming data bus, the method comprising:
   transferring streamed data from the streaming data bus to the core-processing engine using a streaming interface;
   transferring DMA data from the DMA data bus to the core-processing engine using a DMA interface; and
   coordinating data transfer with the core-processing engine between the streaming interface and the DMA interface using an arbiter that performs an arbitration method comprising the steps of:
      receiving a request for data from the core-processing engine indicating when the core-processing engine is ready to process data,
      selecting either the streaming interface or the DMA interface,
      entering into an address phase with the core-processing engine, and
      entering into a data phase with the core-processing engine to transfer data from the selected interface to the core-processing engine,
      wherein, when the streaming interface is selected, during the address phase, a dummy address is used for a host source address for reading data, and a dummy address is used as a host destination address when writing data.

12. The method of claim 11 wherein the request to process data is received on one of a plurality of request signal lines, each request signal line being associated with each of a plurality of channels through which the processing core engine processes data.

13. The method of claim 11 wherein when the DMA interface is selected, the method includes identifying a host address, a local address and a byte count as part of the address phase.

14. The method of claim 11 further comprising the arbiter performing the address phase for at least one channel of a plurality of channels prior to entering into the data phase for the one of the channels.

15. The method of claim 11 further comprising the arbiter performing the address phase for more than one channel of a plurality of channels prior to entering into the data phase for a first one of the channels.

16. The method of claim 11 each channel is associated with either streamed data or DMA data, and wherein the method comprises selecting either the streaming interface or the DMA interface based on type of data associated with the channel from which the request is received.

17. The method of claim 11 wherein in response to the request to process data, the method includes selecting one of the interfaces which has data available for processing.

18. The method of claim 11 wherein the streaming interface is a first interface and the DMA interface is a second interface, and wherein a third interface is provided, and wherein the method further includes coordinating data transfer between the core-processing engine and each of the interfaces.

19. The method of claim 11 wherein the DMA interface is one of either a PCI, PCI 2.0, PCI 2.1, PCI 2.2, PCIX, Infiniband, or HyperTransport interface, and wherein the streaming interface is one of either a PL3, SPI 4, or GMII packet interface.

20. The method of claim 11 further comprising providing a common address bus and data bus between the core-processing engine and each of the interfaces for the data transfer with the core-processing engine.

21. The method of claim 11 wherein a first address bus and data bus couple the streaming interface with the core-processing engine through a switching fabric, and a second address bus and data bus couple the DMA interface with the core-processing engine through the switching fabric.

22. A system operable to transfer data between a processing engine and a plurality of bus types, the system comprising:
a streaming interface to transfer streamed data between a streaming data bus and the processing engine;
a DMA interface to transfer DMA data between a DMA data bus and the processing engine; and
an arbiter for coordinating data transfer between the processing engine and both the streaming interface and the DMA interface, the arbiter configured to receive a data processing request from the processing engine, the data processing request indicating when the processing engine is ready to process data, the arbiter operable in response to the data processing request, to (i) select either the streaming interface or the DMA interface, (ii) enter into an address phase with the processing engine, and (iii) enter into a data phase with the processing engine to transfer data from the selected interface to the processing engine,
wherein, when the streaming interface is selected, during the address phase, a dummy address is used for a host source address for reading data, and a dummy address is used as a host destination address when writing data.

23. A method of transferring data between a processing engine and a plurality of bus types, the method comprising:
transferring streamed data from a streaming data bus to the processing engine using a streaming input/output (I/O) core and a streaming interface, the streaming I/O core configured to implement a streaming data protocol;
transferring DMA data from a DMA data bus to the processing engine using a DMA I/O core and a DMA interface, the DMA I/O core configured to implement a DMA protocol; and
coordinating data transfer from the streaming interface and the DMA data bus using an arbiter that performs an arbitration method comprising the steps of:
receiving a request for data from the core-processing engine indicating when the core-processing engine is ready to process data,
selecting either the streaming interface or the DMA interface,
entering into an address phase with the core-processing engine, and
entering into a data phase with the core-processing engine to transfer data from the selected interface to the core-processing engine,
wherein, when the streaming interface is selected, during the address phase, a dummy address is used for a host source address for reading data, and a dummy address is used as a host destination address when writing data.

24. The system of claim 1 further comprising:
a streaming I/O core coupled between the streaming data bus and the streaming interface and configured to implement a streaming data protocol; and
a DMA I/O core coupled between the DMA data bus and the DMA interface and configured to implement a DMA protocol.

25. The system of claim 24 wherein the DMA I/O core comprises a state machine that implements a DMA protocol for one of either a PCI, PCI 2.0, PCI 2.1, PCI 2.2, PCIX, Infniband, or HyperTransport interface, and wherein the streaming I/O core comprises a state machine that implements a streaming data protocol for one of either a PL3, SP_I 4, or GMII packet interface.

* * * * *